J. PFEIFFER, P. OLAH & A. G. FALKENSTEIN.
TROLLEY.
APPLICATION FILED FEB. 21, 1912.
1,086,613.
Patented Feb. 10, 1914.
4 SHEETS—SHEET 2.
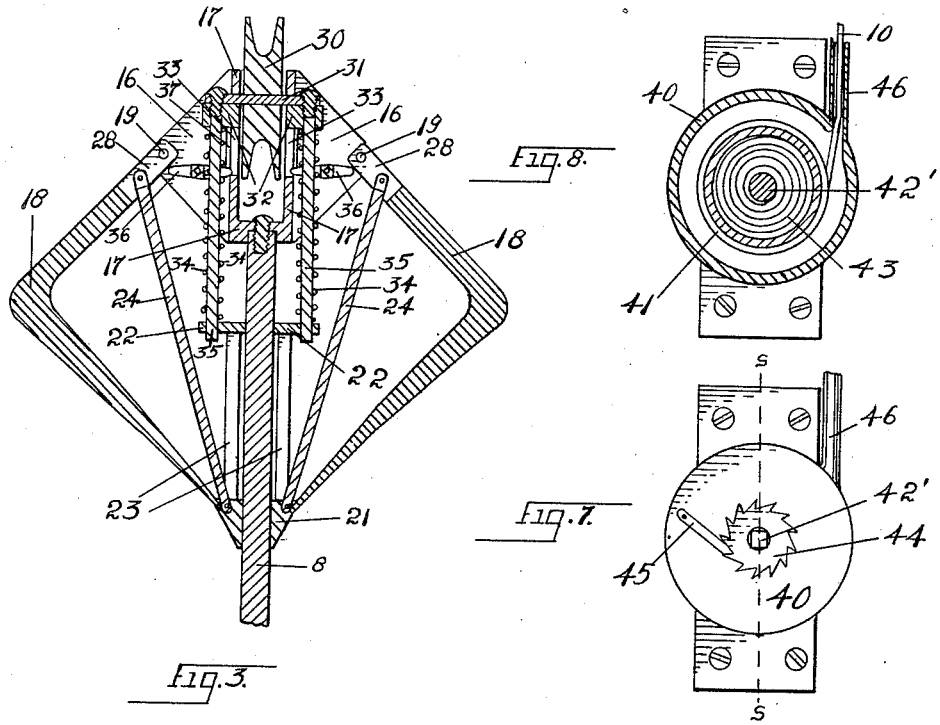
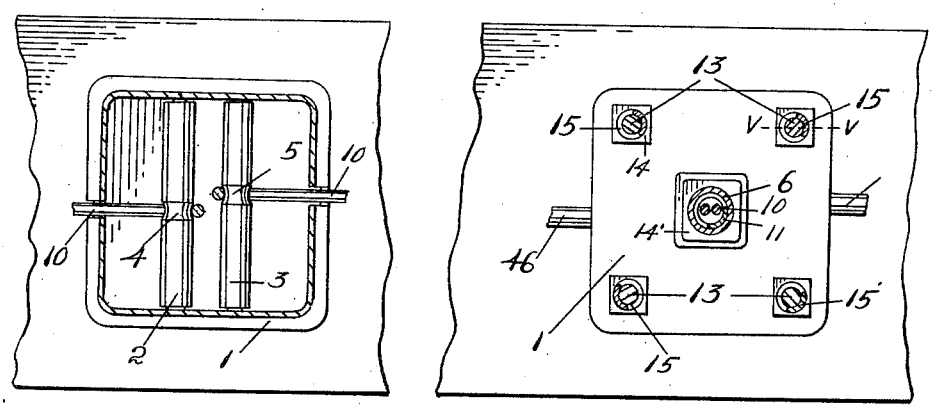
Witnesses:
F. W. Thomas.
R. B. McIntosh
Jacob Pfeiffer
Paul Olah and
Alexander G. Falkenstein
Inventors.
by
J. M. Thomas
Attorney

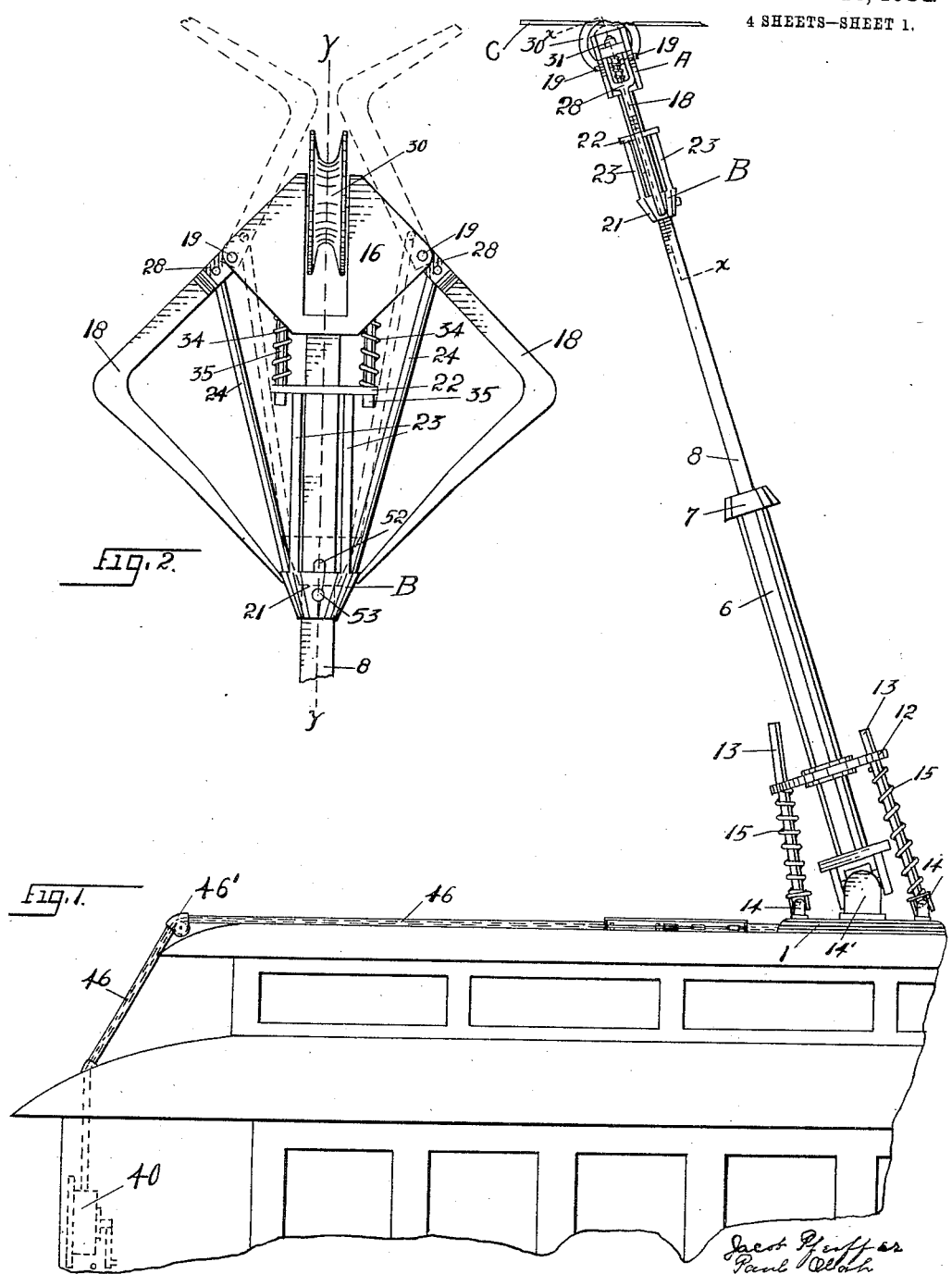

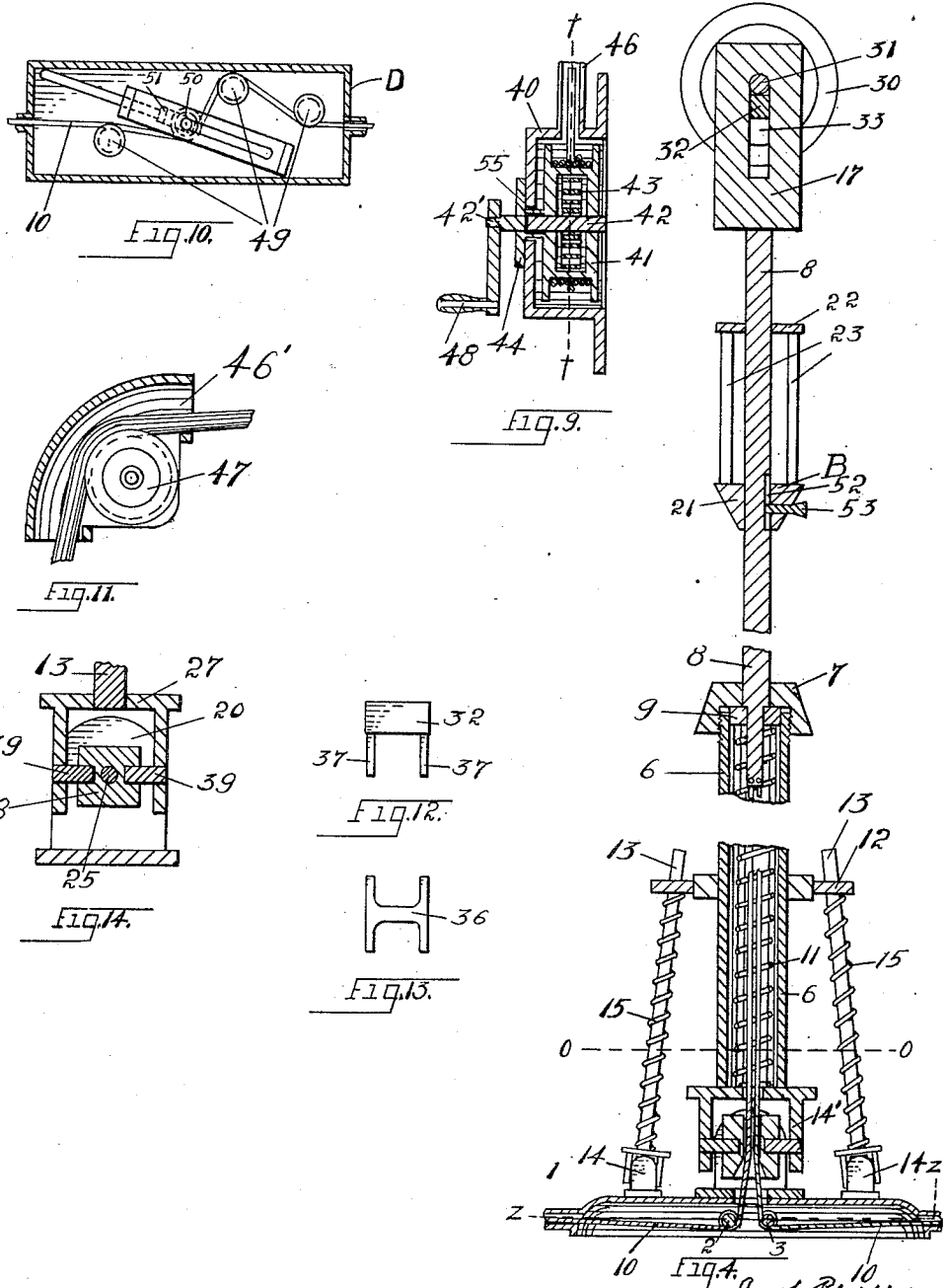

J. PFEIFFER, P. OLAH & A. G. FALKENSTEIN.
TROLLEY.
APPLICATION FILED FEB. 21, 1912.

1,086,613.

Patented Feb. 10, 1914.
4 SHEETS—SHEET 4.

UNITED STATES PATENT OFFICE.

JACOB PFEIFFER, PAUL OLAH, AND ALEXANDER G. FALKENSTEIN, OF SALT LAKE CITY, UTAH.

TROLLEY.

1,086,613.  Specification of Letters Patent.  Patented Feb. 10, 1914.

Application filed February 21, 1912. Serial No. 679,108.

*To all whom it may concern:*

Be it known that we, JACOB PFEIFFER, PAUL OLAH, and ALEXANDER G. FALKENSTEIN, citizens of the United States, residing at Salt Lake City, in the county of Salt Lake and State of Utah, have invented certain new and useful Improvements in Trolleys, of which the following is a specification.

Our invention relates to trolleys used on street cars and other electrically propelled vehicles, and has for its object to provide a trolley that will not jump or leave the wire so frequently when the car is turning on a curve in the track, and should such happen, that will be quickly and automatically lowered to prevent injury to the stay wires.

A further object is to provide a trolley that is held more yieldingly in contact with the line wire than those now in use whereby the utility of the contacting members is much prolonged.

We accomplish these and other objects with the apparatus illustrated in the accompanying drawings in which similar letters of reference indicate like parts throughout the several figures, and as described in the specifications forming a part of this application.

Figure 15:
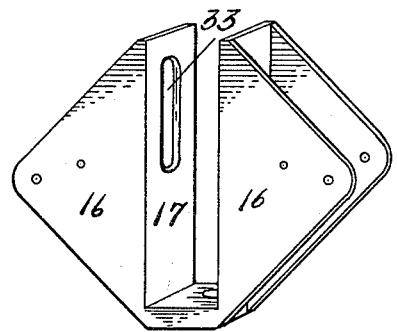
Figure 16:
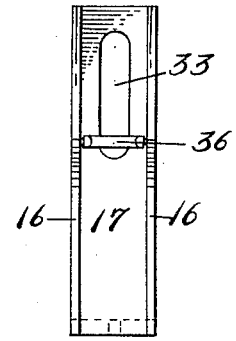
Figure 17:
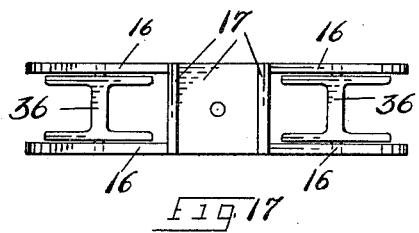

Figure 1 is a fragmentary view in side elevation of a street car and line wire with our apparatus in place thereon. Fig. 2 is an enlarged front elevation of the pulley case and connected parts with a portion of the trolley pole. Fig. 3 is a vertical section of the same, on line $x$ $x$ in Fig. 1. Fig. 4 is a vertical section of the apparatus on line $y$ $y$ in Fig. 2, parts cut away. Fig. 5 is a horizontal section on line $z$ $z$ of Fig. 4. Fig. 6 is a horizontal section on line $o$ $o$ in Fig. 4. Fig. 7 is an elevation of the drum case. Fig. 8 is a vertical section on line $t$ $t$ of Fig. 9. Fig. 9 is a vertical section on line $s$ $s$ of Fig. 7 and through the crank handle. Fig. 10 is a horizontal section through the cable tightener. Fig. 11 is a vertical section through one of the couplings in the cable carrying pipe. Fig. 12 is a plan view of one of the trip levers. Fig. 13 is a side elevation of one of the trip dogs. Fig. 14 is an enlarged vertical section on the line $v$ $v$ Fig. 6. Fig. 15 is a view in perspective of the side and web plates. Fig. 16 is an elevation of the same looking in the direction of the face of the web plates. Fig. 17 is a plan view of the side and web plates, and trip levers in place between the side plates.

Our trolley consists of a base 1 having an opening centrally therein, and adjacent said opening and mounted on the under side of said base are two rollers 2 and 3, having channels 4 and 5 respectively cut therearound in staggered relation to each other. Mounted on the upper side of said base 1 and above said opening is the trolley tube 6, which has a threaded cap nut 7 secured on the upper end thereof. Said cap nut 7 has a square opening therethrough within which is made to operate the trolley pole 8. A collar 9 is rigidly secured on the lower portion of said pole 8, by any suitable means that will prevent it from sliding or being moved longitudinally on said pole. Said collar is provided thereon to prevent the said pole 8 from being unintentionally removed from said tube 6. To the lower end of said pole 8 is attached the trolley cables 10. Within said tube 6, and inclosing a portion of said pole 8 is fitted the spiral spring 11 provided therein to aid in holding said pole normally in the upper end of said tube and when compressed to allow the greater portion of said pole to telescope within said tube 6. Securely fastened around said tube 6 and carried thereby is the guide plate 12 which has openings therein to guide the trolley braces 13 of which there are preferably four in number. Each of said trolley braces 13 is pivoted at its lower end to said base 1 by a universal pivot 14. Said pivots 14 permit the upper end of each of said braces 13 to move in any lateral direction. The said tube 6 is also pivoted to said base 1 with a pivot 14' similar in shape to said pivots 14 except that it is larger and has an opening therethrough alined with the opening in said base 1 provided therein to permit the trolley cables 10 being slidably operated therein. Each of said pivots 14 consists of a U-shaped bracket 20 having a hole in each of the vertical portions thereof, and an inverted U-shaped bracket 27 having a hole in each of the depending portions thereof. Within the cavity formed by placing the said bracket 27 transversely over the said bracket 20 is fitted a square block 38 having pivot pins 39 secured therein and made to operate in the said holes in said bracket 27 and with an opening therethrough to receive a pivot pin 25 and which is secured in the holes in said brackets 20. Carried on each of said trolley braces 13 is a spiral spring 15 having its lower end supported by one of the said pivots 14. On the upper end of said trolley pole 8 is fastened the pulley case A, consisting of two side plates 16 and the connecting web plates 17. Pivotally mounted in said case A between the side plates 16 are the guard arms 18, each having one end portion bifurcated as at 28 and the prongs thereof spread to contact with the inner side of said plates 16 and through which the pivots 19 are fitted. Carried on said pole 8 is the guide frame B consisting of a base 21 and a guide plate 22 spaced therefrom by the uprights 23 which may be formed integral with said base. Said guide frame B is slidably carried on said pole 8 and allowed limited longitudinal movement thereon by having a slot 52 cut in the side of said pole. A threaded set-lug 53 is screwed through a threaded hole in the side of said base 21 with the end of said lug engaging in slot 52. Pivoted to said base 21 and between said uprights 23 are the link rods 24, each of which has its upper end pivoted between prongs of the bifurcated end 28 of the guard arms 18. The pulley 30 is mounted between the said web plates of said case A and has its axle or shaft 31 mounted in vertically movable bearings 32. Said bearings 32 have a limited vertical movement in openings or slots 33 which are cut in said web plates 17 of said case A. Supporting each of said bearings 32 is a spiral spring 34 resting on the said guide plate 22. Within each of said springs 34 and fastened to one of the said bearings 32 is one of the depending guide rods 35 which rods are slidably fitted in holes in said guide plate 22. Pivoted between the said plates 16 are the trip levers 36, one end of each of which normally engages the inner lower corner of one of the said guard arms 18. Depending from each of the said bearings 32 is a trip dog 37 provided thereon to engage and trip the said levers 36. The said trolley cables 10 after each has passed over its respective roller 2 or 3 is connected with a spring held drum, one each of which is secured on each end of the car, and as both are alike we will herein describe but one.

On the end of the car and within reach of the operator is secured a cable case 40, preferably cylindrical in form within which a cable drum 41 is mounted on a stud shaft 42. One end of a spring 43 is attached to said shaft 42 and the other end to the inner face of said drum 41. Concentrically secured on a neck 55 integral with one end of said drum is a ratchet wheel 44, and pivoted on the end of said drum case 40 is the dog 45, engaging at times with the teeth of said ratchet wheel 44. One end of the said trolley cable 10 is fastened on the peripheral face of said drum and the said cable is then passed through the pipe 46 and over the cable tightener D and over its respective roller 2, to the lower end of said pole 8 to which it is secured. Where the general direction of the said pipe 46 changes, as at angles, a coupling 46' is used; within which is mounted a pulley 47, over which the said cable is operated, (see Fig. 11). A crank handle 48 is fitted on the outer end of the said shaft 42' by means of which the said drum 41 is turned when said dog 45 engages the teeth of said ratchet wheel 44. The slack of said cable 10 is at all times taken up and the length thereof regulated by means of the tightener D which consists of pulleys 49 over which the said cable is passed. Between two of said puleys 49 is made to operate the floating pulley 50 which is mounted in a spring held bearing 51, and over which said cable is also passed. Each of said tighteners D consists of a casing in which is mounted in bearings in the said casing the pulleys 49 and between two of said pulleys is a floating pulley 50, the bearings of which are held by springs which allows said pulley to change its position in a slotted rack. The springs are mounted on the bearings. The tension of the said springs is to hold the pulley in one end of this rack. The tension of the cable 10 when passed over said pulley 50 tends to draw the pulley to the other end of the rack and against the tension of the springs. The shafts 42' and 42 abut each other on the end.

42' is the shaft on which the drum is mounted and 42 is the shaft on which or by means of which one end of the spring is held. The line joining the two is the line shown practically parallel with the end of the drum 40.

The turning of the handle 48 and winding up of the spring is in the reverse direction to the winding of the cable 10 on the drum. When the tension of the spring unwinds, the cable is wound up.

The operation of our apparatus is as follows: With the trolley pulley in place on the line wire C, the operator winds up the spring 43 in the drum case 40 by turning the said shaft 42' with the crank handle 48 and setting the dog 45 so that it engages in the teeth of the ratchet 44. Should he release the said drum by disengaging the dog 45 from its engagement with said ratchet 44 and allow the said spring 43 to unwind, the said drum 41 will be turned and the said cable 10 will be wound therearound and the said trolley pole 8 will be drawn downward and partially telescoped within said tube 6 and thereby compress said spring 11. The pulley 30 will then be below the line wire C and out of contact therewith. The downward motion of the said pole 8 will cause the said base 21 to strike the top of the said cap nut 7 with force enough to move the said pole slidably within said base 21 until the said set-lug 53 contacts with the end of the said slot 52. This motion and contact will cause the said link rods 24 to force or throw the said line guide 18 to the position shown in dotted lines in Fig. 2. By releasing the tension of said spring 43 on the said pole 8, as connected therewith through the drum 41 and cable 10, which the operator does by again winding up the said drum, the trolley will assume a vertical position, as shown in Fig. 4; the said spring 11 will force the said pole vertically upward until the said pulley will contact with the said line wire C. With the members as shown in dotted line in Fig. 2, the momentum given all that portion of the trolley above the cap nut 7, by said spring 11, will be arrested as to the pulley and bearings when the pulley 30 strikes the line wire C; but the said momentum will carry the other members of the trolley-head somewhat farther upward. The pivot and outer portions of said levers 36 will be carried upward, while the end portions adjacent the trip dogs 37 will be struck with the lower end of said dogs. This contact and blow will move said levers on their pivots and the outer ends will engage the lower edges of said guard arms 18 and trip them from the upper or dotted line position and throw the free ends of said arms outward and from each other. Said guard arms will then fall by reason of their weight to the position shown in Fig. 3. Should the line wire C break or the said pulley for any reason leave the line the upward movement of the upper portions of our apparatus caused by the said spiral spring 11 will release the engagement of the said dog 45 with the said ratchet wheel 44 and allow the tension of the said spring 43 to telescope the greater part of the said pole 8 within the said tube 6. The universal pivots used on the bottom of the said tube 6 and the trolley braces 13 when said tube is supported by the springs 15 permits the pulley to follow the line wire although it may not be vertically over the base end of the trolley. The said springs 34 provide a secondary and additional resiliency or spring under the pulley 30 to that of the said spring 11 to hold it in contact with the line wire C, and as the weight sustained by them being simply the said pulley and bearings 32; the said springs may be lighter and their compression easier than said spring 11 which has to support the weight of all the upper parts of our apparatus. We are thus enabled to supply a yielding and constant contact between the said pulley and the line wire.

Having thus described our invention we desire to secure by Letters Patent and claim:

1. A trolley consisting of a tube pivoted to the top of a car; a pole adapted to telescope within said tube; a spiral spring within said tube to normally hold said pole in the upper portion of the tube; side and web plates fastened together to form a pulley case and secured on said pole; a pulley mounted in said case; vertically movable bearings therefor; springs adapted to support said bearings; a guide frame carried on said pole, consisting of a base and uprights; a guide plate provided with openings therein and supported by said uprights; and guide rods secured to said pulley bearings and adapted to slide within said openings.

2. A trolley consisting of a tube pivoted to the top of a car; a pole adapted to telescope within said tube; a spiral spring within said tube adapted to normally hold said pole in the upper portion of said tube; a pulley case secured on the upper end of said pole, consisting of side plates and web plates; guard arms pivoted between said side plates; a pulley mounted in said case; spring supported bearings for said pulley; a guide frame carried on said pole consisting of a base; a guide plate spaced therefrom; guide rods secured to said pulley bearings and adapted to slide within openings provided in said guide plate; and link rods pivoted to said base and having their upper ends pivoted to the inner ends of said guard arms.

3. A trolley consisting of pole; a pulley case secured on the upper end of said pole consisting of side and web plates; guard arms pivoted between the side plates; a pulley mounted in said case; spring supported bearings for said pulley; trip levers pivoted between said side plates; trip dogs to engage said levers when moved by said spring supported bearings; a guide frame carried on said pole consisting of a base and uprights; a guide plate fastened on said uprights and provided with openings therein; guide rods fastened to said pulley bearings and adapted to slide within said openings; link rods pivoted to said base and having their upper ends pivoted to the inner ends of said guard arms.

4. A trolley consisting of a spring supported pole; a pulley case consisting of side and web plates mounted on said pole; guard arms pivoted between said side plates; a pulley mounted in said case; spring supported bearings for said pulley; a base slidably carried on said pole; link rods pivoted to said base and having their upper ends pivoted to the inner ends of said guard arms; trip levers pivoted between said side plates; and trip dogs to engage said levers when moved by said spring supported bearings.

In testimony whereof we have affixed our signatures in presence of two witnesses.

JACOB PFEIFFER.
    PAUL OLAH.
    ALEXANDER G. FALKENSTEIN.

Witnesses:
    FRANK H. HALL,
    R. B. McINTOSH.

---

Copies of this patent may be obtained for five cents each, by addressing the "Commissioner of Patents, Washington, D. C."